Feb. 9, 1954  J. M. CHRISTMAN  2,668,480
METHOD AND MEANS FOR BURRING OR CHAMFERING GEARS
Filed Jan. 7, 1950  9 Sheets-Sheet 1

FIG. 1

INVENTOR.
JOHN M. CHRISTMAN
BY
ATTORNEY

Feb. 9, 1954 J. M. CHRISTMAN 2,668,480
METHOD AND MEANS FOR BURRING OR CHAMFERING GEARS
Filed Jan. 7, 1950 9 Sheets-Sheet 2

INVENTOR.
John M. Christman
BY
ATTORNEY

Feb. 9, 1954   J. M. CHRISTMAN   2,668,480
METHOD AND MEANS FOR BURRING OR CHAMFERING GEARS
Filed Jan. 7, 1950   9 Sheets-Sheet 3

INVENTOR.
JOHN M. CHRISTMAN
BY
ATTORNEY

Feb. 9, 1954 J. M. CHRISTMAN 2,668,480
METHOD AND MEANS FOR BURRING OR CHAMFERING GEARS
Filed Jan. 7, 1950 9 Sheets-Sheet 5

INVENTOR.
JOHN M. CHRISTMAN
BY
ATTORNEY

Feb. 9, 1954     J. M. CHRISTMAN     2,668,480
METHOD AND MEANS FOR BURRING OR CHAMFERING GEARS
Filed Jan. 7, 1950     9 Sheets-Sheet 6

INVENTOR.
JOHN M. CHRISTMAN
BY
ATTORNEY

Feb. 9, 1954　　　J. M. CHRISTMAN　　　2,668,480
METHOD AND MEANS FOR BURRING OR CHAMFERING GEARS
Filed Jan. 7, 1950　　　9 Sheets-Sheet 7

INVENTOR.
JOHN M. CHRISTMAN
BY
ATTORNEY

Feb. 9, 1954     J. M. CHRISTMAN     2,668,480
METHOD AND MEANS FOR BURRING OR CHAMFERING GEARS
Filed Jan. 7, 1950     9 Sheets-Sheet 9

INVENTOR.
JOHN M. CHRISTMAN
BY
Gregory S. Dolgorukov
ATTORNEY

Patented Feb. 9, 1954

2,668,480

UNITED STATES PATENT OFFICE 2,668,480

METHOD AND MEANS FOR BURRING OR CHAMFERING GEARS

John M. Christman, Grosse Pointe Woods, Mich.

Application January 7, 1950, Serial No. 137,420

40 Claims. (Cl. 90—1.4)

This invention relates to an improved method and means for burring or chamfering gears.

In the production of spur gears and spiral gears the gear teeth including the top, sides and root thereof at the end faces of the gear are burred due to the cutting of teeth into the blank from which the gear is cut. It is necessary to remove the burr at the corners of the teeth and root at the end faces of the gear so as to present smooth end faces. Ofttimes the burrs are removed by filing which is time-consuming, expensive and generally unsatisfactory due to inaccuracies in hand work. As an alternate to burring by the hand filing method, the burring of gears has been accomplished by machine chamfering the gear teeth including the top, sides and root thereof at the end faces of the gear.

Several types of gear burring or chamfering methods and machines have been employed heretofore, however, none has proven economical and thoroughly satisfactory, particularly in chamfering the top, sides and root of the gear teeth at the end faces of the gears. This is because the usual method and means of machine chamfering of gear teeth is not susceptible to high production, the gears must be loaded and clamped into the chamfering machine, and the resulting chamfer obtained is not uniform along the top of the gear teeth, the sides of the gear teeth and the root between the gear teeth.

With the foregoing in view, it is the primary object of the invention to provide an economical method and machine for chamfering gear teeth including the top, sides and roots thereof or any such portion thereof at the end face of the gear at high production rates and with a substantially uniform chamfer throughout.

Another object of the invention is to provide an improved method and an improved machine for chamfering edges of objects at internal and external angles and particularly end edges of gear teeth, whereby such edges can be chamfered selectively at roots, roots and sides, sides and tops, tops and roots, or simultaneously any combination at the ends of tops, sides and roots of the gear teeth or similar elements.

Another object of the invention is to provide a method and machine for chamfering gear teeth including the tops, sides and roots thereof at the end face of the gear wherein the work, whether a spur or spiral gear or splined shaft or other toothed element, may be loaded into the machine without stopping the same, wherein the cutting action employed in chamfering the gear holds the work in chamfering position during chamfering, and wherein the work may be unloaded from the machine when completely chamfered without stopping the machine.

Another object of the invention is to provide a method and machine for chamfering gear teeth including the tops, sides and roots thereof at the end face of the gear which provides for chamfering small diameter gears and gears where formations on the work piece adjacent the end face of the gear normally would cause interference with the chamfering operations.

A further object of the invention is to provide an improved, economical and facile method and machine for uniformly chamfering gear teeth including the tops, sides and roots thereof at the end face of the gear employing spaced cutting elements operating on the near sides and more than one-half the top and root adjacent the said near sides of spaced pairs of teeth progressively and at a high production rate with the cutting elements urging the gear being chamfered into chamfering position gaging the chamfer from the end of the gear being chamfered, all with manual loading and unloading of work being chamfered into and out of the machine while running.

Other objects of the invention will be observed by reference to the following detailed description taken in connection with the accompanying drawings, in which:

Fig. 15 is an enlarged view in perspective of the operating and cutting mechanism of the gear burring or chamfering machine disclosed in Fig. 1 with a spiral gear W to be chamfered loaded in chamfering position on the arbor thereof and in registry with the pilot gear.

Fig. 15-A is a fragmentary view in perspective showing a gear to be chamfered closing a microswitch which controls either the starting and stopping of the chamfering machine or which may operate a visual or other signal timed to show when a gear being chamfered is completely chamfered.

Figs. 19 and 20 show diagrammatically how a substantially uniform chamfer is obtained by employing the method and means disclosed herein for chamfering gear teeth with spaced cutting elements operating on the near sides and more than one-half the top and root adjacent spaced gear teeth, only one cutting element shown, the cutting element not shown being opposite hand.

The invention, as before stated, relates to an improved method and means for burring or chamfering gears. Hereafter, when the operation of "chamfering" is referred to, it will be understood that "burring" is also included since the "burring" of gears is in effect "chamfering" except to a lesser degree, less material being removed in the burring operation than in the chamfering operation.

The novel method of chamfering gear teeth embodying the invention comprises, in general, of placing a gear to be chamfered on an arbor including a work support in freely rotatable relationship with respect thereto with the face of the gear to be chamfered adjacent the work support and with spaced teeth of the gear to be chamfered in registry with a cutter having oppositely disposed spaced cutting elements, applying the said cutter to chamfer the near sides and more than one-half the top and root adjacent the near sides of the said spaced teeth at an angle which will urge the gear being chamfered against the said work suport and the said arbor, rotating the said gear being chamfered intermittently presenting adjacent pairs of spaced teeth thereof into registry with the said cutter and applying the said cutter thereto and repeating such chamfer cutting cycle until all of the teeth of the gear have been completely chamfered, the space between teeth being chamfered during any single chamfer cutting cycle and the angle of application of the cutting tool being such as will provide a substantially equal chamfer at the near sides and more than one-half the top and root adjacent the near sides of the spaced teeth. The means hereinafter described for accomplishing the foregoing method is illustrative and preferred; however, it is to be understood that other means may be employed to accomplish the novel, economical and facile method of chamfering gears herein set forth.

Referring now to the drawings wherein like numerals refer to like and corresponding parts throughout the several views, the embodiment of the invention disclosed in Figs. 1-22 inclusive comprises, in general, a base 10 mounted on a pedestal 100, a drive shaft 11 journaled in the base 10 and driven by an electric motor or the like, not shown, through a pulley 12 mounted on the said drive shaft 11 and a suitable V-belt 13, an arbor 14 onto which a gear W to be chamfered is positioned in freely turnable relationship thereto, a work support 15 at the base of the said arbor 14 against which the gear W to be chamfered rests and is urged during chamfering, a pilot gear 16 to which the gear W to be chamfered is meshed when loaded onto the said arbor 14, a gear train and intermittent drive mechanism generally designated by the numeral 17 turning the pilot gear 16 intermittently, a cutter 18 including spaced cutting elements 19 spaced and formed to chamfer the near sides and more than one-half the adjacent top and root of spaced gear teeth on the gear W to be chamfered, a cutter rocker arm 20 including a cutter mounting block 21 at the top thereof to accommodate the cutter 18, a rocker arm shaft 22 including an eccentric 23 fixed thereon or formed integral therewith onto which the said cutter rocker arm 20 is pivotally mounted to accomplish a reciprocating action of the cutter 18, a relief arm 24 adjustably fixed to the said cutter rocker arm shaft 22 for reciprocating the said rocker arm shaft arcuately to accomplish relief of the cutter 18 after each chamfer cut of the said cutter 18, a cutter cam 25 and a relief cam 26 mounted on the said drive shaft 11 rotatable therewith, the said cams 25 and 26 being shaped to reciprocate the cutter 18 and accomplish relief of the said cutter 18 in the desired timed relationship, a cutter cam follower 27 on the said cutter rocker arm 20 and a relief cam follower 28 on the relief arm 24, and spring means 29 and 30 on the said cutter rocker arm 20 and the said relief arm 24 anchored to the base 10 constantly urging the said cutter cam follower 27 and the said relief cam follower 28 into engagement with the said cutter cam 25 and relief cam 26 respectively.

Figure 1:
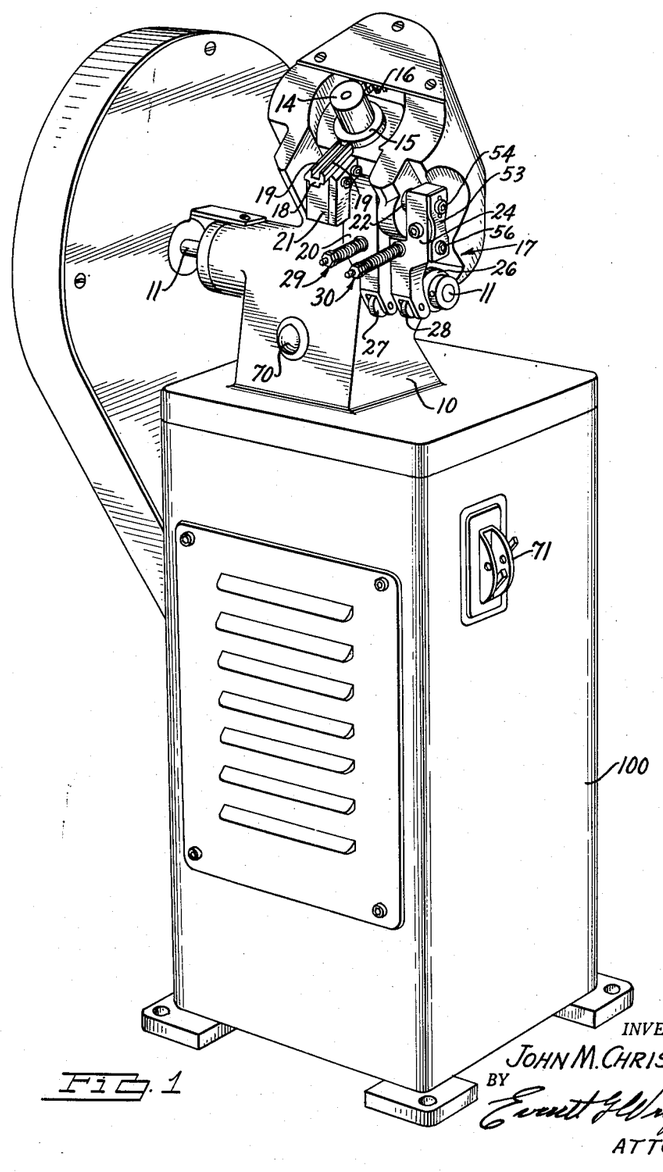
Fig. 1 is a view in perspective showing a gear burring or chamfering machine embodying the invention.
Figure 2:
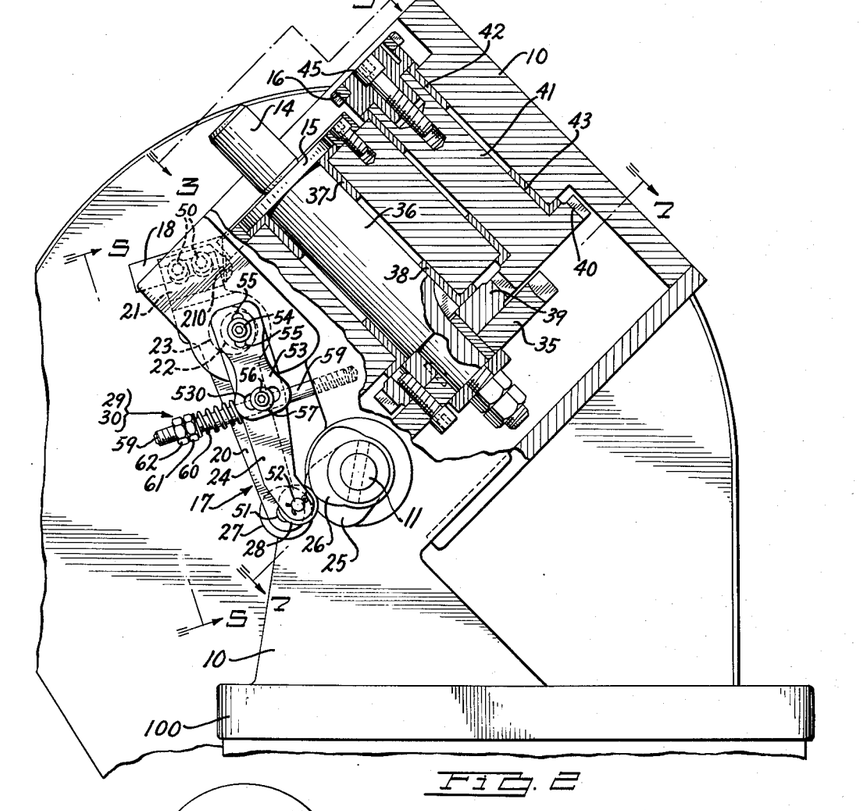
Fig. 2 is an enlarged fragmentary side elevational view of the burring or chamfering machine disclosed in Fig. 1 with portions broken away and the pilot gear cover plate removed.
Figure 3:
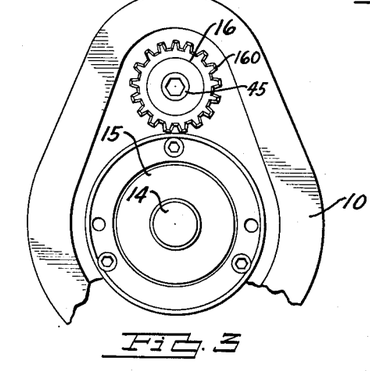
Fig. 3 is an elevational view taken on the line 3—3 of Fig. 2.
Figure 4:
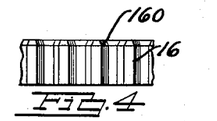
Fig. 4 is an enlarged fragmentary elevational view of the pilot gear showing the chamfered top of the teeth thereof.

Referring particularly to Figs. 1–7 inclusive, the base 10 mounted on the pedestal 100 is bored at 31 to accommodate bearings 32 and 33 through which the drive shaft 11 is journaled. Between the said bearings 32 and 33 is mounted an interrupted worm 34 which engages a pinion gear 35 which is keyed to a main shaft 36 journaled in the base 10 on suitable bearings 37 and 38. Keyed to the main shaft 36 is a timing gear 39 which meshes with the timing gear 40 on the pilot gear shaft 41 journaled on bearings 42 and 43 in the base 10. The pilot gear 16 is fixed in rotary adjustable relationship to the top of the pilot gear shaft 41 by such means as a stud 45 as indicated in Fig. 2. By suitably adjusting the pilot gear 16 circumferentially with respect to the pilot gear shaft 41, a heavy chamfer cut may be taken on one side of gear teeth of a gear W to be chamfered and a lighter cut on the opposite sides thereof. At the top of the main shaft 36 is mounted an arbor 14 including a work support 15 onto which a gear W to be chamfered is telescoped manually. The pilot gear 16 is preferably chamfered at the top of its teeth at 160, see Fig. 4, so as to accommodate readily the meshing therewith of the gear W to be chamfered. The work support 15 is preferably formed to support the gear W to be chamfered inwardly of the teeth thereof, or, if the gear to be chamfered is provided with a hub held to proper tolerance with respect to the face of the gear, the work support 15 will be formed to support the gear W to be chamfered at its hub. This procedure employs either the face or the hub of the gear for a working point rather than the burred ends of the teeth of the gear W to be chamfered, thus aiding in the assurance of uniform chamfering. Where it is impossible to support the gear W to be chamfered inwardly of its teeth, the gear W to be chamfered is supported on a work support of several rather than all of its teeth, and the gear will be chamfered using an over-run equal to the number of teeth on which the gear is supported. This also aids in assuring uniform chamfering.

The lead of the interrupted worm 34 and the ratio of the pinion gear 35, the timing gears 39 and 40, the pilot gear 16 and the gear W to be chamfered are such that the gear W to be chamfered is turned the distance of the circular pitch of the gear W to be chamfered with each revolution of the main drive shaft 11.

Parallel to the main drive shaft 11 and into supports 46 preferably formed integral with the base 10 is mounted the rocker arm shaft 22 on suitable bearings 47, the said rocker arm shaft 22 being provided with or having formed integral therewith the rocker arm eccentric 23 which is disposed between the said supports 46 and bearings 47. The cutter rocker arm 20 is journaled onto the rocker arm eccentric 23 by means of the bearing 48.

Figures 5, 6, 7:
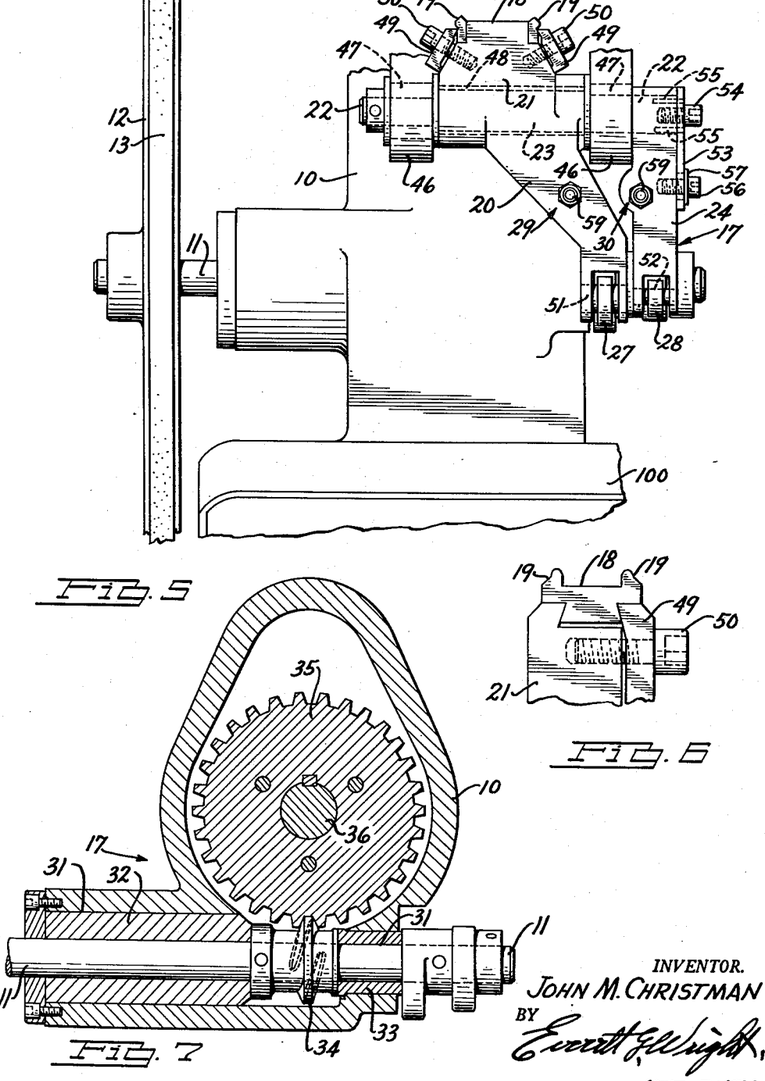
Fig. 5 is an enlarged fragmentary front elevational view taken on the line 5—5 of Fig. 2.
Fig. 6 is an elevational view showing a one piece double cutting element type burring or chamfering cutter which may be substituted for the dual burring or chamfering cutter shown in Fig. 5.
Fig. 7 is a sectional view taken on the line 7—7 of Fig. 2 showing the interrupted worm type indexing mechanism preferably employed.

The cutter rocker arm 20 extends above and below the rocker arm shaft 22 and eccentric 23 and has at the upper end thereof a cutter mounting block 21. The said cutter mounting block 21 including a cutter clamping member or keeper 49 which engages the base of the cutter 18 clamps the said cutter 18 in a position which will accomplish the desired chamfer cuts on the gear W to be chamfered. The cutter 18 may be one piece with integral spaced cutting elements 19 as shown in Figs. 1, 6, 15 and 17, or, the cutter 18 may be formed of two separate spaced cutting elements 19 as shown in Fig. 5, in which event two cutter clamping members 49 are employed. In either case, the cutter 18 composed of two spaced cutting elements 19, or, the two separate spaced cutting elements 19 are secured in their proper position against a stop 210 provided on the cutter mounting block 21 by cutter clamping members 49 and suitable studs 50. The lower end of the cutter rocker arm 20 is preferably bifurcated and the cutter cam follower 27 is journaled on a pin 51 disposed between the forks thereof. The relief arm 24 is journaled onto the end of the rocker arm shaft 22 and extends therebelow. The lower end of the relief arm 28 is preferably bifurcated and the relief cam follower 28 is journaled on a pin 52 disposed between the forks thereof.

To adjust the position of the eccentric 23 on the rocker arm shaft 22 and to anchor the eccentric 23 in its adjusted position, an adjusting plate 53 is secured to the end of the rocker arm shaft 22 by a stud 54, and the said adjusting plate 53 is fixed or pinned in non-turnable relationship to the said rocker arm shaft 22 by a pair of pins 55. The adjusting plate 53 is arcuately slotted at its lower end at 530 to accommodate a stud 56 threaded into the side of the relief arm 24, which stud 56 is tightened to lock the adjusting plate 53 in its adjusted position. A washer 57 between the adjusting plate 53 and the head of the stud 56 provides proper area of contact for positive locking of the adjusting plate 53 in its adjusted position.

By moving the adjusting plate 53 arcuately, the rocker arm shaft 22 and the eccentric 23 thereon is turned which moves the location of the cutter 18 and its cutting elements 19 with respect to the gear W to be chamfered to provide a light or heavy chamfer.

Figure 8:
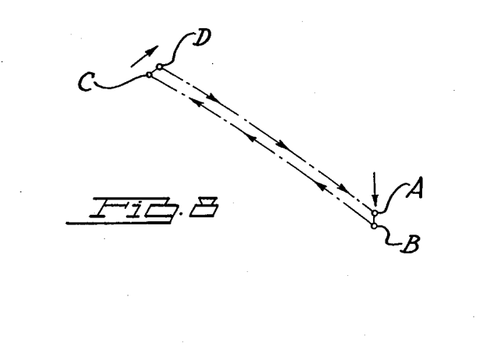
Fig. 8 is a diagrammatic view showing a preferred path of the cutting edge of the chamfering cutter during one complete revolution of the cutter actuating cam and the relief cam.
Figure 9:
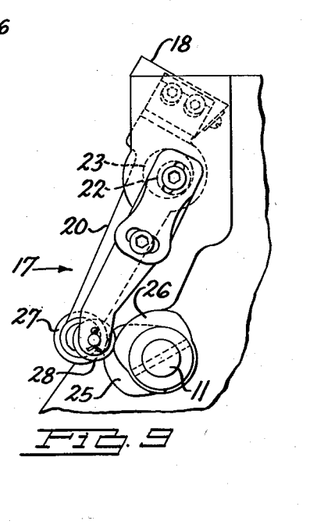
Figs. 9, 10, 11 and 12 show the positions of the cutter actuating cam and the relief cam when the cutting edge of the chamfering cutter is located respectively at points A, B, C and D of Fig. 8 during one complete revolution of the said cutter actuating cam and the relief cam.
Figure 10:
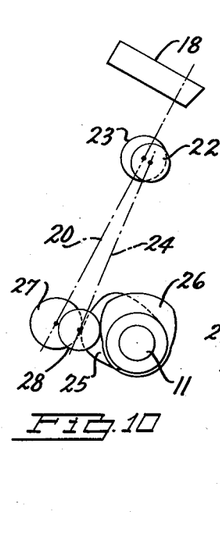
Figure 11:
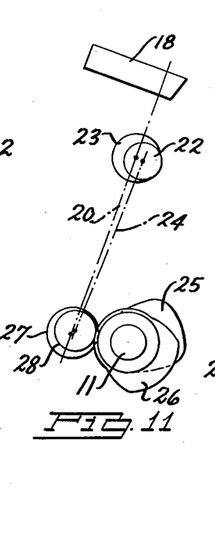
Figure 12:
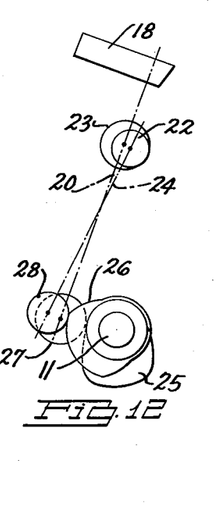

The cutter cam 25 and the relief cam 26 are formed to provide the desired pattern of movement of the cutter 18 and its cutting elements 19, the particular pattern of movement of the cutter 18 indicated in Fig. 8 and accomplished by the cutter cam 25 and relief cam 26 as indicated in Figs. 9, 10, 11 and 12 being variable according to the cams employed, the extent of the eccentricity of the eccentric 23 on the rocker arm shaft 22, and the adjustment of the rocker arm shaft 22. Obviously, the relief movement of the cutter 18 may be eliminated, in which event there would be a slight drag of the cutter 18 across the cut surface on the return stroke of the cutter 18.

To assure that the cutter cam follower 27 and the relief cam follower 28 follow the cutter cam 25 and the relief cam 26 respectively at all times, spring means generally designated by the numerals 29 and 30 respectively are provided. The cutter rocker arm 20 and the relief arm 24 are each provided with a bored and counterbored aperture 58 therethrough to accommodate telescopingly a stud 59 threaded into the base 19 around which a compression spring 60 is positioned, the lower end of the said compression spring 60 resting against the base of the counterbore of the apertures 58 in the cutter arm 20 and the relief arm 24. The outer ends of the studs 59 are provided with an adjusting nut 61 and a lock nut 62 by means of which the desired compression of the springs 60 may be attained.

Figure 13:
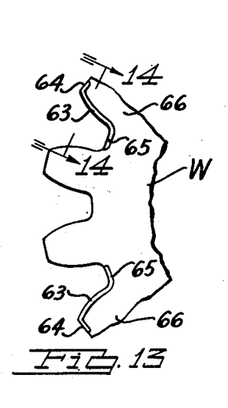
Fig. 13 is an enlarged fragmentary bottom elevational view of a gear W partially chamfered showing chamfer cuts on the near sides and at more than one-half the top and root adjacent the said near sides of spaced teeth.
Figure 14:
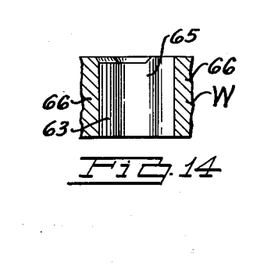
Fig. 14 is a view part in section and part in elevation of the chamfer cuts shown in Fig. 13.

By referring to Figs. 13 and 14, it will be observed that the adjacent sides 63 of spaced teeth 66 in a gear W to be chamfered are chamfered by a single cut of the cutter 18 having spaced cutter elements 19, and, if desired, at the same time, more than one-half of the tops 64 and more than one-half of the roots 65 of the said spaced teeth of the gear W are chamfered by a single cut of the said cutter 18. Obviously, if it is not desired to chamfer the tops or the roots of the teeth of a gear W to be chamfered, the cutting elements 19 of the cutter 18 would be so formed. In some production instances, the circular blank from which a gear is cut is circumferentially chamfered prior to cutting the gear teeth, in which event, it is not necessary to chamfer the top of the gear teeth, and the cutter 18 is formed to chamfer the sides and roots of the gear W.

Figure 17:
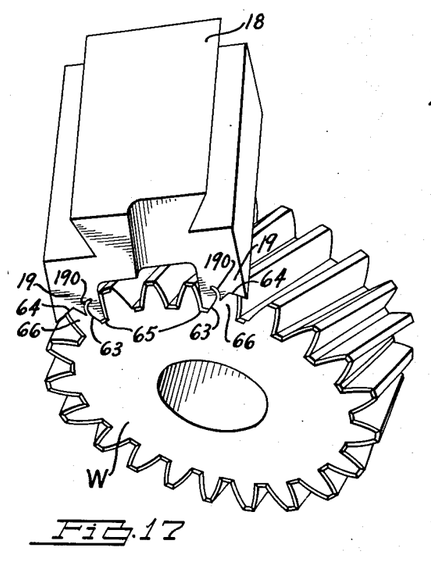
Fig. 17 is an enlarged bottom view in perspective of a spiral gear being chamfered at opposite sides of spaced teeth thereof by the spaced cutting edges of the chamfering cutter.

Fig. 17 is an enlarged bottom view in perspective of a spiral gear W being chamfered by the method and means herein disclosed wherein the spaced cutting elements 19 of the cutter 18 take cuts 190 on the near sides 63 of spaced teeth 66 and on more than one-half the tops 64 and roots 65 adjacent the said near sides 63 of the spaced teeth 66 of the said gear W being chamfered. In Fig. 17 all but two pairs of spaced teeth 66 have been chamfered on both sides, one pair of spaced teeth is in the process of being chamfered on their near sides, and one pair of spaced teeth are yet to be chamfered on their near sides.

Figure 18:
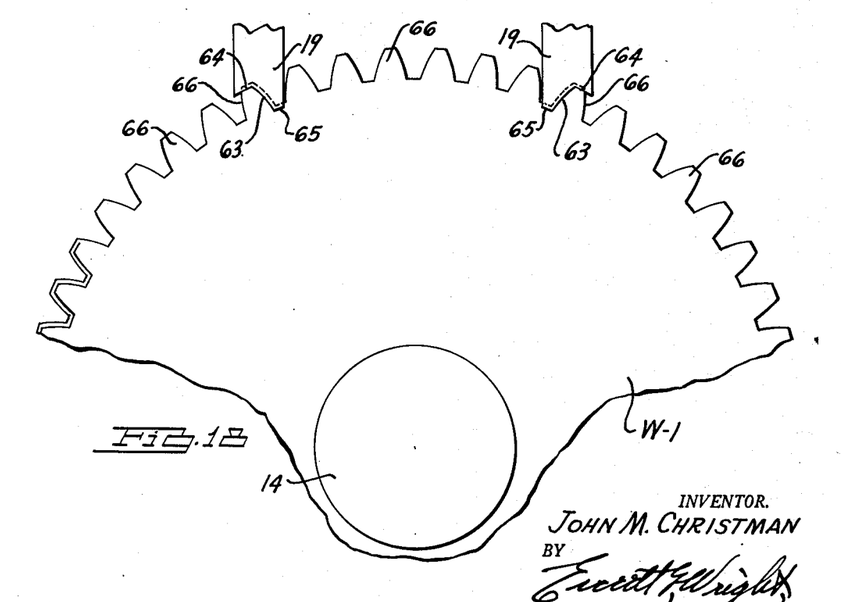
Fig. 18 is a more or less diagrammatic view of a spur gear to be chamfered showing the application of spaced cutting elements operating on the near sides and more than one-half the top and root adjacent the said near sides of spaced pairs of the gear teeth.
Figure 19:
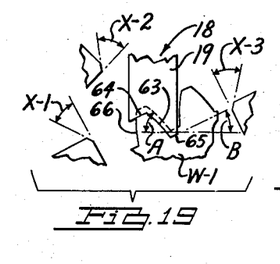
Fig. 19 is a fragmentary portion of the left-hand side of Fig. 18 showing one of the cutters and two gear teeth.
Figure 27:
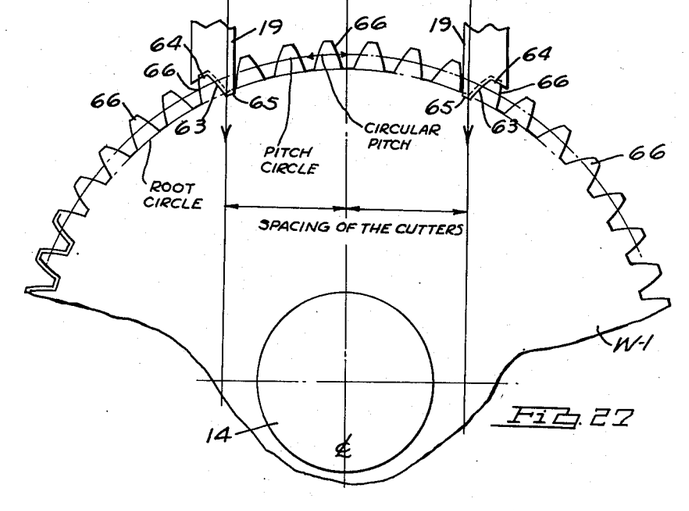
Fig. 27 is the same diagrammatic view as Fig. 18 with the center lines, the pitch circle of the gear, the circular pitch of the gear, and the direction of the movement of the cutters having been indicated thereon.
Figure 28:
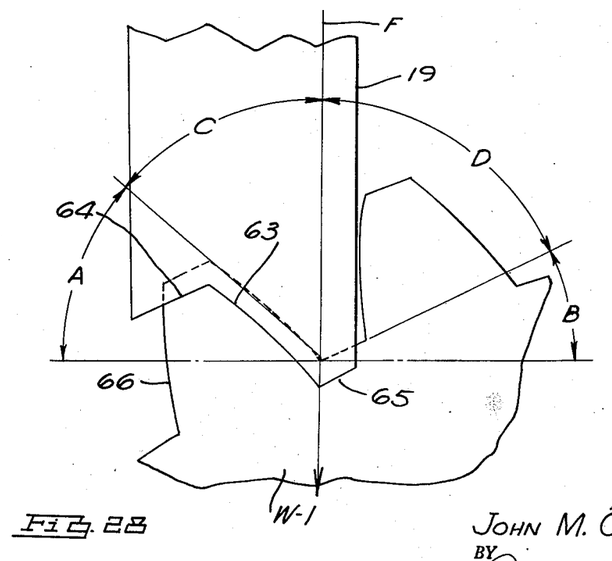
Fig. 28 is a portion of Fig. 19 drawn on a larger scale, with chamfer projections being omitted for the sake of clarity and in order to make the geometric construction showing the relationship between the line of the cutter movement and the angles formed by said line with the side and the root edges of the chamfered tooth stand out more clearly.

By referring now to Figs. 18 and 27, it will be observed that it is preferable to space the cutting elements 19 of the cutter 18 so that they, without interference with adjacent teeth, will bridge the maximum number of teeth 66 of the gear W-1 to be chamfered and at the same time accomplish a substantially uniform chamfer or the desired chamfer at the near sides 63 of the spaced teeth 66 and more than half the tops 64 and roots 65 adjacent the said spaced teeth 66 of a gear W-1 to be chamfered. Referring to Figs. 19 and 28, the angles A and B are preferably as nearly equal as possible at each of the teeth to be cut by oppositely disposed spaced cutting elements. It will be clear from an examination of Figs. 19 and 28 that since angles A and B are angles formed respectively by the side and root edges of the chamfered tooth with a base line perpendicular to the cutter path, the equality of the angles A and B desired in order to produce uniform chamfer on the respective edges may be also expressed in the terms of desired equality of the complementary angles C and D, i. e., equality of the angles which the line F representing the direction of the movement of the apex of the cutter 19 (i. e., place of juncture of the edges 63 and 65 of the cutter 19) makes with the side tooth edge and the root edge of the tooth. In other words, since it is desired that the angles A and B are as nearly equal as possible, it follows that it is desired that the line F bisects as nearly as possible the mean angle which is formed by the meeting edges to be chamfered (side edge and root edge of the tooth 66 in Fig. 19). It will be understood that a similar geometric construction may be drawn with respect to top and side tooth edges by drawing a line showing the movement of the vertex formed of the meeting edges 64 and 63 of the cutter 19. It will also be seen from examination of Figs. 19 and 28, that the apex of the cutter 19 moves during cutting along the line of intersection of the planes of chamfers cut on the side and root edges of the tooth.

Figure 20:
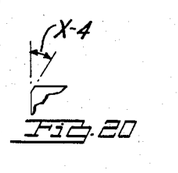

The cutting elements 19 of the cutter 19 are so spaced and applied at such an angle of attack on the near sides 63 of spaced teeth 66 and more than half the tops 64 and the roots 65 adjacent the spaced teeth 66 of a spur gear W-1 that the chamfers produced on said edges will be substantially equal; i. e., the angles X-1, X-2 and X-3 are substantially equal when a uniform chamfer is to be accomplished. In Figs. 19 and 20, X-1 is the angle of chamfer at the top 64 of a spaced tooth 66, X-2 is the angle of chamfer at the near side 63 of a spaced tooth 66, X-3 is the angle of chamfer at the root 65 adjacent the near side of a spaced tooth 66 being chamfered, and X-4 is the angle of chamfer at the intersection between the side 63 and root 65 of a spaced tooth 66 being chamfered. X-4 is also the average tool stroke angle of the cutting elements 19 of the cutter 18 moving from D to A as indicated diagrammatically in Fig. 8. When the spanning of spaced teeth 66 to be chamfered is sufficient to accomplish a substantially uniform chamfer throughout, the angles X-1, X-2 and X-3 approach the desired angle of 45 degrees; for example, if X-1, X-2 and X-3 are approximately 45 degrees, then X-4 will be approximately 40 degrees.

The angle of chamfer at the real or imaginary intersection between planes of chamfer of the meeting tooth edge of side 63 and of the edge of the top 64, or the meeting tooth edge of side 63 and edge of root 65, i. e. the angle X-4 (see Fig. 20), is termed the "tool stroke angle," and it represents the path of the cutter since every point of the cutting edge of the cutter moves substantially parallel to this tool stroke angle along an arcuate line DA, Fig. 8. The radius of the arc compared to its length is such that curvature of said arc line may be neglected and such arcuate line may be considered as a substantially straight line.

In Fig. 18 the angle of chamfer at the intersection of the edge of side 63 and edge of root 65 on the right hand side is the same as the angle of chamfer at the intersection of the edge of side 63 and edge of root 65 on the left hand side and they are most nearly parallel to each other only when the most desirable whole number of teeth are spanned between said intersections. For example six teeth are spanned in Fig. 18. The tool stroke angles on the right hand side and left hand side are parallel to each other since both cutting elements 19 move together during the chamfer cut and since the corresponding angle of chamfers at the intersections are parallel or nearly parallel to each other the most uniform chamfers are obtained under said conditions.

In cases where the next tooth interferes with each cutting element as it chamfers the side edge and more than one-half of the root edge, fewer than the most desirable whole number of teeth are spanned, but the chamfers are uniform enough to be acceptable.

For some jobs it may be desirable to have a different chamfer angle on the sides of the teeth than the roots, or chamfers other than 45°. It is evident from the foregoing that by proper selection of the number of teeth spanned, selection of the proper tool stroke angle, and since one cutting element can be nearer to the center line of the work part than the other cutting element, almost unlimited variations of chamfering angles may be produced.

Figure 21:
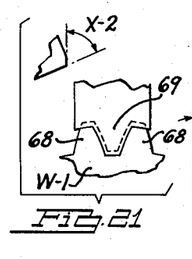
Figs. 21 and 22 show diagrammatically how an ununiform chamfer is obtained by employing a method of chamfering gear teeth with a single cutting element operating on the top and adjacent sides of adjacent gear teeth and the root therebetween.
Figure 22:
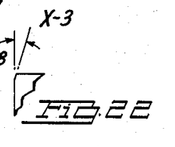

In contradistinction, if adjacent teeth 68 are chamfered on adjacent sides and at adjacent tops and at the root therebteween by a single cutter 69 as indicated in Figs. 21 and 22, the cutting angles X-2 and X-3 are, for example, approximately 58 degrees and 31 degrees respectively, or approximately 15 degrees from the 45 degrees desired to accomplish a substantially uniform chamfer throughout. In this case it should be noted that the root edge is perpendicular to the cutter path, instead of extending at an angle thereto, such as at an angle "B" in Fig. 19, thus causing ununiform chamfers.

The typical examples just given apply to spur gear chamfering; however, the principles involved in spiral gear chamfering are the same except compensation is made for the helix angle of the spiral gear.

The chamfering of both spur gears and spiral gears may be accomplished with equal facility by the novel method and means herein disclosed, it being only necessary to employ either a spur or spiral pilot gear 16 to accommodate either a spur or spiral gear W to be chamfered, and to alter the angle of attack of the cutter 18 to compensate for the helix angle of the spiral gear. In chamfering spiral gears, it may be desirable but it is not necessary to establish the direction of rotation of the pilot gear 16 to urge the spiral gear W to be chamfered downward toward the work support 15.

In the operation of a gear chamfering machine embodying the invention and employing the method herein disclosed, the gear W to be chamfered is merely telescoped over the arbor 14 while the machine is running. The gear W to be chamfered readily becomes engaged with the pilot gear 16 as it is telescoped onto the arbor 14. While telescoping the said gear W to be chamfered onto the arbor 14, it is only necessary to place the said gear W into abutment against the work support 15, and the machine then takes over. The drive shaft 11 operates at a relatively high speed, preferably from 300 to 600 R. P. M., and since the cutter 18 reciprocates and the gear W indexes at a like speed, the gear W to be chamfered will be completely chamfered in one revolution in a period of time in minutes equal to the number of teeth in the gear W divided by the R. P. M. of the drive shaft 11. For example, if the drive shaft speed is 420 R. P. M. and the gear W to be chamfered has 21 teeth, the gear W will be chamfered in 1/20 of a minute or 3 seconds. The speed of the cutter 18 is governed by the length of the chamfer cut on the gear tooth, for example, on some metals the maximum tool cutting speed is 90 F. P. M.

The operator of the machine soon becomes familiar with the time required to completely chamfer a gear W and removes it from the arbor 14 at the proper time while the machine is running and replaces it with another gear W to be chamfered, also while the machine is running. Thus, extremely rapid and inexpensive gear chamfering can be accomplished by the novel method and means herein disclosed as well as providing a more uniform and satisfactory chamfer than heretofore was possible at a like and similar cost. The feeding of a gear W to be chamfered onto the arbor 14 and the removal of a gear W after chamfering from the arbor 14 is such a simple operation that expert operators are not required and no machine training is necessary to perfectly and uniformly chamfer gears at a minimum expense.

Figures 15, 15A:
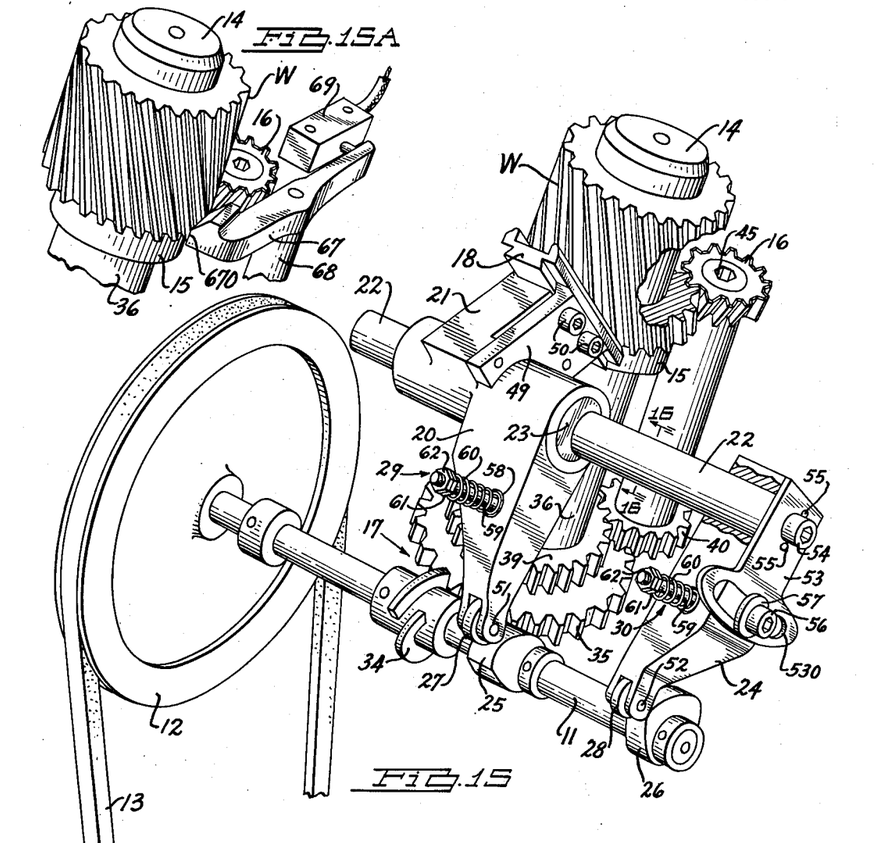

Although not shown, any suitable cycle indicator means known in the art may be employed to indicate visually or audibly when a gear being chamfered is completely chamfered. Furthermore, although it is economically desirable to run the machine continuously, on certain classes of work or under certain working conditions it may be desirable to start and stop the machine at the beginning and at the completion of the chamfering of each gear. To accomplish the foregoing, a cam lever 67 having a cam surface 670 is pivoted on a support 68 extending upwardly from the base 10 adjacent the gear W to be chamfered and is moved by the said gear W to be chamfered when the said gear W is telescoped manually onto the arbor 14 and positioned against the work support 15, the movement of the said cam lever 17 closes a spring loaded normally open micro-switch contactor or the like 69 when the gear W to be chamfered is positioned onto the arbor 14 and against the work support 15. When the micro-switch or the like 69 is closed, the chamfering machine is started and continues to run through a complete cycle of chamfering, and, by use of timing mechanism well known in the art, the machine stops running when a gear W to be chamfered is completely chamfered. As before pointed out, the machine may be run continuously, in which event, the micro-switch 69 closed by the cam lever 67 may operate a signal light 70 preferably located on the front of the base 10 which remains lighted under control of suitable timing mechanism well known in the art until the gear W to be chamfered has been completely chamfered. When the signal light 70 goes out, the operator is informed that the gear W to be chamfered is completely chamfered, and the operator removes the completely chamfered gear W from the arbor 14 and places another gear W to be chamfered thereon. A master "on-off" switch 71 located on the side of the pedestal 100 is normally employed to start and stop the machine at the beginning and end of each period of use.

Figure 16:
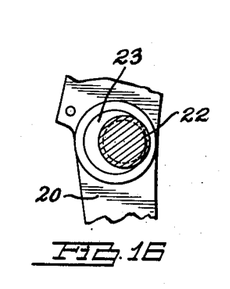
Fig. 16 is a sectional view taken on the line 16—16 of Fig. 15 showing the eccentric mounting of the cutter rocker arm on the cutter rocker arm shaft.
Figures 23, 24:
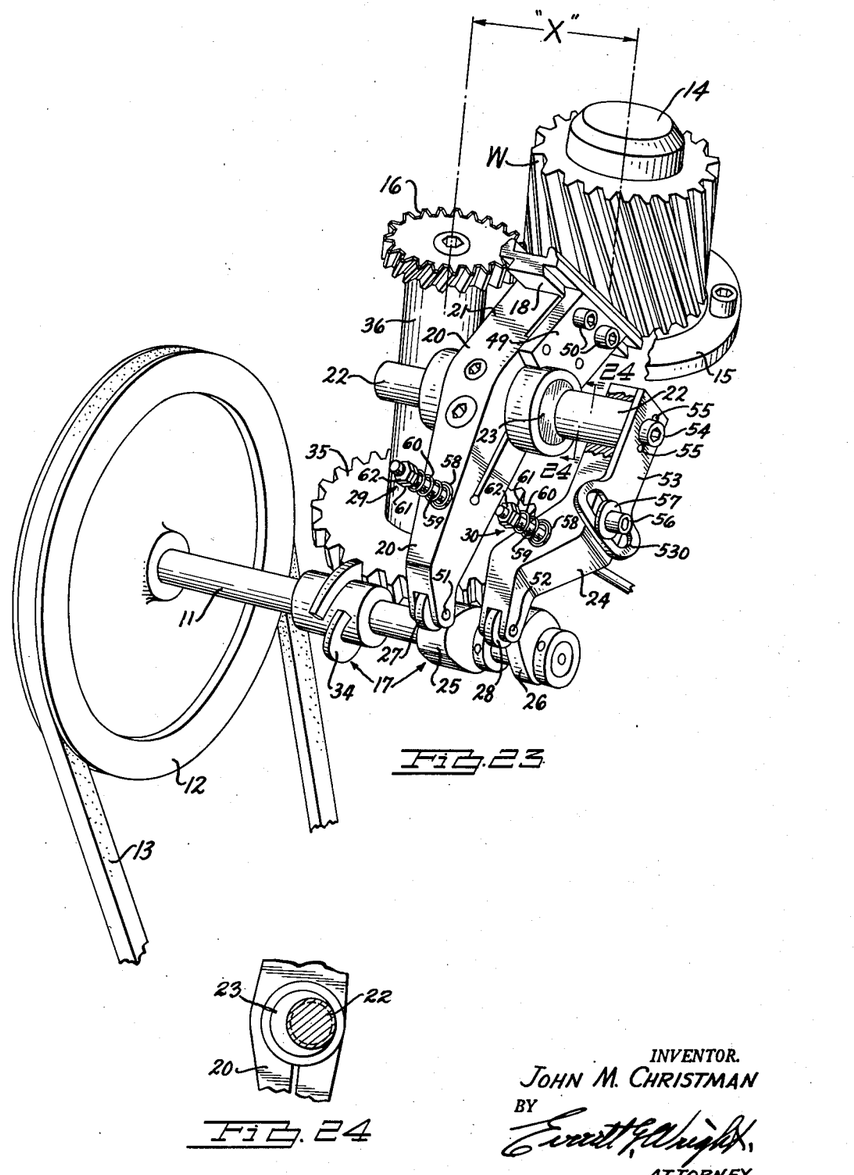
Fig. 23 is an enlarged view in perspective showing the operating and cutting mechanism of an alternate embodiment of the invention which may be employed to chamber various sizes of gears with differet numbers of teeth by substituting pilot gears and changing the center distance between the arbor and the pilot gear.
Fig. 24 is a sectional view taken on the line 24—24 of Fig. 23 showing the eccentric mounting of the cutter rocker arm on the cutter rocker arm shaft.

Figs. 23 and 24 which are like and similar to Figs. 15 and 16 show an alternative embodiment of the invention which is similar to the embodiment of the invention disclosed in Figs. 1-22 inclusive and particularly in Figs. 15 and 16, except that the pilot gear 16 is mounted directly onto the main shaft 36 and the timing gears 39 and 40 and the pilot gear shaft 41 have been omitted. However, the arbor 14 and work support 15 are adjustable as to their spacing "X" with respect to the main shaft 36 to accommodate different sizes of pilot gears 16 whereby to permit the chamfering machine to be set-up to function on different diameters of gears W to be chamfered with different gear W characteristics. Obviously, when the centers between the arbor 14 and the pilot gear 44 are changed, the cutter rocker arm 29 and the cutter cam 25 must be moved longitudinally on the eccentric 23 of the rocker arm shaft 22 and the drive shaft 11 respectively into alignment with the adjusted location of the arbor 14 and work support 15.

Figure 25:
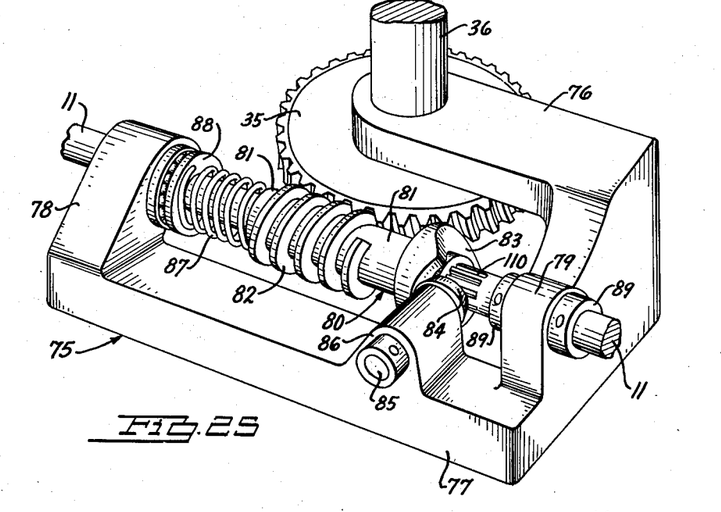
Fig. 25 is a view in perspective of a cam-worm type of indexing mechanism which may replace the interrupted worm type indexing mechanism shown in Fig. 7.

In Fig. 25 is illustrated an alternate cam-worm construction 75 that may replace the interrupted worm 34 of the intermittent drive mechanism 17 which engages the pinion gear 35 on the main shaft 36 illustrated in Figs. 15 and 23. The cam-worm construction 75 is employed to rotate intermittently the pinion gear 35 mounted on the main shaft 36, which main shaft 36 is journaled vertically through an arm 76 of a mounting block 77 carrying the cam-worm construction 75. The mounting block 77 is provided with a pair of spaced bearing lugs 78 and 79. The drive shaft 11 is rotatably supported at the bearing lugs 78 and 79 and is suitably splined at 110 to accommodate slideably thereon and rotatable therewith a cam-worm 80 composed of an internally splined sleeve 81 having a worm 82 cut thereon which engages and turns the pinion gear 35, and an axially disposed annular cam 83 formed on one end of the said sleeve 81. A cam follower 84 is formed on the end of a cam follower shaft 85, and the cam follower shaft 85 is journaled in a bearing lug 86 disposed at right angles to the drive shaft 11 whereby to rotatably support the cam follower 84. The cam-worm 80 is constantly urged against the cam follower 84 with the cam surface of the axially disposed annular cam 83 of the cam-worm 80 in engagement with the cam follower 84 by means of a compression spring 87 disposed in spaced relationship around the drive shaft 11 and positioned between the end of the cam-worm 80 and the bearing lug 78. A suitable thrust type ball bearing 88 is disposed around the drive shaft 11 between the end of the compression spring 87 and the bearing lug 78 to serve as an anti-friction medium therebetween. Suitable collars 89 are pinned to the drive shaft 11 each side of the bearing lug 79 to prevent axial movement of the said drive shaft 11 with respect to the mounting block 77. The cam surface of the axially disposed cam 80 is so formed as to cause the cam-worm 80 to move axially with respect to the drive shaft 11 during a portion of one revolution of the said drive shaft 11 at a rate that will cause the worm to idle in its normal function of turning the pinion gear 35 and then permit the said cam-worm 80 to move rapidly axially on the drive shaft 11 during the remainder of the said revolution thereof whereby to turn the pinion gear 35, thus accomplishing an accurate intermittent turning of the pinion gear 35. Obviously, the axially disposed cam 80 is formed to turn the pinion gear the desired portion of a revolution with each revolution of the drive shaft 11. On heavy and certain special work, this cam-worm intermittent drive mechanism 75 may be preferred over the interrupted worm mechanism 17.

Figure 26:
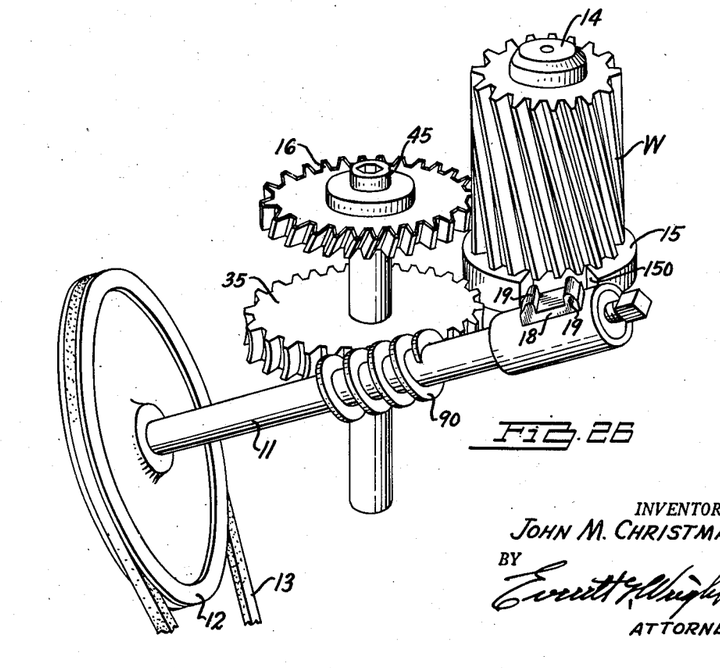
Fig. 26 is still another embodiment of the invention employing a rotary rather than a reciprocating type cutter to chamfer the near sides and more than one-half the top and root adjacent the said near sides of spaced teeth on a gear positioned onto and freely turnable with respect to an arbor responsive to continuous worm driven indexing mechanism.

In Fig. 26 is disclosed an alternate embodiment of the invention which may be employed on some types and sizes of gears to be chamfered. In this embodiment of the invention the pulley 12 driven by the V-belt 13 rotates the drive shaft 11 having a worm 90 thereon which meshes with a pinion gear 35 on the main shaft 36. The pilot gear 16 is fixed in rotary adjustable relationship onto the main shaft 36 by a stud 45, preferably using like and similar construction as shown in Fig. 2 where the pilot gear 16 is fixed onto the pilot gear shaft 41. The arbor 14 and work support 15 are so positioned with respect to the pilot gear 16 that when the pilot gear rotates, it will rotate a gear W to be chamfered which is manually telescoped over the arbor 14 in seated relationship onto the work support 15. The work support 15 is notched out at 150 to accommodate the cutter 18 having spaced cutting elements 19 formed to chamfer the near sides and more than one-half the tops and roots adjacent the near sides of the said spaced teeth, the cutter 18 being mounted on the drive shaft 11 for rotation therewith. The rotation of the cutter 18 is so synchronized with the turning of the gear W to be chamfered by the pilot gear 16 that for each revolution of the said cutter the gear W to be chamfered turns the distance of the circular pitch of the said gear W to be chamfered. The drive shaft 11 and the cutter 18 thereon are so disposed that the spaced teeth 19 of the said cutter 18 attack the gear W to be chamfered at an angle that will provide a substantially uniform chamfer at the top, sides and root of all teeth, and, at the same time, the angle of attack of the cutter 18 on the gear W to be chamfered is such that the said gear W to be chamfered will be held in chamfering position on the arbor 14 and against the work support 15 whereby gears W to be chamfered may be manually loaded onto the arbor 14, chamfered, and manually removed from the arbor 14 without stopping the machine and without the use of mechanism to clamp or otherwise fix the gears W to be chamfered in cutting position onto the arbor.

The term "arbor" as used herein obviously means any desirable type of an arbor or work locator onto or in which gears or other work W to be chamfered are positioned, the configuration of the work determining the type of arbor or work locator required; however, in any event, it is not required that gears or other work W to be chamfered need be clamped or otherwise fixed to the arbor or work locator, the gears or other work to be chamfered being gaged against the work support, by the cutter action thereon during the operation of the chamfering machine leaving the said gears or other work W to be chamfered free to be telescoped manually onto or into and removed from the arbor or work locator while the chamfering machine is running.

Although but several embodiments of the invention have been disclosed and described in detail, it is obvious that many changes may be made in the method steps and in the size, shape, arrangement and detail 1 of the various elements of the invention without departing from the spirit and scope thereof as defined by the appended claims.

I claim:

1. The method of chamfering toothed elements comprising the placing of a toothed element in freely slidable and rotatable relationship on an arbor axially against a stop, the applying of a cutting tool at the face of the toothed element bearing against said stop simultaneously to the near sides and more than one-half the root adjacent the said near sides of spaced teeth at an angle urging the toothed element against the said stop, turning the toothed element whereby to present other spaced teeth to the cutting tool, applying the cutting tool simultaneously to the near sides and more than one-half the root adjacent the said near sides of the other spaced teeth, and repeating the said cycle until all of the teeth are completely chamfered on both sides and root thereof.

2. The method of chamfering toothed elements comprising the placing of a toothed element in freely slidable and rotatable relationship on an arbor axially against a stop, the applying of a cutting tool at the face of the toothed element bearing against said stop simultaneously to the near sides and more than one-half the top and root adjacent the said near sides of spaced teeth at an angle urging the toothed element against the said stop, turning the toothed element whereby to present other spaced teeth to the cutting tool, applying the cutting tool simultaneously to the near sides and more than one-half the top and root adjacent the said near sides of the other spaced teeth, and repeating the said cycle until all of the teeth are completely chamfered on both sides and top thereof and root therebetween.

3. The method of chamfering gear teeth comprising the placing of a gear to be chamfered on an arbor including a work support in freely slidable and rotatable relationship with respect thereto with the face of the gear to be chamfered bearing against the said work support and with spaced teeth of the gear to be chamfered in registry with a cutter having oppositely disposed spaced cutting elements, applying the said cutter to chamfer the near sides and more than one-half the top and root adjacent the near sides of the said spaced teeth at an angle that will urge the gear being chamfered against the said arbor and against the said work support, rotating the said gear being chamfered intermittently presenting adjacent pairs of spaced teeth thereof into registry with the said cutter and applying the said cutter thereto, and then repeating such chamfer cutting cycle until all of the teeth of the gear have been completely chamfered, the space between teeth being chamfered during any single chamfer cutting cycle and the angle of application of the cutting tool being such as will provide a substantially equal chamfer at the near sides and at more than one-half the top and root adjacent the near sides of the spaced teeth.

4. A machine for chamfering toothed elements comprising an arbor onto which work to be chamfered may be positioned in freely slidable and turnable relationship while the machine is operating, a work support against which work on the arbor rests, a pilot gear to which the work is engaged when placed on the arbor, a cutter including spaced cutting elements formed to chamfer the near sides and more than one-half the top and root adjacent the said near sides of spaced teeth, means for applying the cutter to the work intermittently at cutting speed and at an angle forcing the work toward the center of the arbor and against the work support whereby to gage the work against the said work support, and means for turning the pilot gear whereby to present adjacent pairs of spaced teeth on the work successively in timed relationship to the cutter, the said work being free on the arbor for manual removal from the arbor while the machine is operating.

5. In a machine for chamfering gear teeth, a work locator onto which work to be chamfered may be manually positioned and removed from while the machine is operating, a work support against which work on the locator is positioned, means for turning the work on the locator freely engageable and disengageable by the work when the work is manually positioned onto and removed from the said locator, and a cutting element including mechanism reciprocating the same in timed relationship to the turning of the work on the locator in a path providing an angle of cut on the gear teeth of the work which forces the work simultaneously toward the locator and against the work support whereby to gage the work against the work support during the operation of the machine.

6. In a machine for chamfering gear teeth, an arbor and a work support onto and against which a gear to be chamfered may be positioned and removed manually during the operation of the machine, a pilot gear with which the gear to be chamfered becomes meshed when positioned onto the arbor, a cutter including mechanism for applying the same to teeth in the gear to be chamfered at an angle which causes the gear to be chamfered to gage itself against the said work support during the chamfer cut, means coupling the pilot gear and the cutting mechanism whereby to cause the cutter to chamfer successive teeth until all of the teeth in the work gear have been completely chamfered.

7. In a gear chamfering machine, an arbor having an open end and work support onto and against which a work gear to be chamfered may be positioned and removed manually during the operation of the machine with the cutter thereof moving through its cutting path, a cutter including laterally spaced cutting elements formed to cut the near sides and more than one-half the root adjacent the said near sides of spaced teeth of the gear to be chamfered, and means for applying the said cutter at the face of the gear bearing against said work support to the near sides and more than one-half the root adjacent the said near sides of successive pairs of spaced teeth of the gear to be chamfered until the sides and roots of all of the teeth of the gear to be chamfered are chamfered, the angle of attack of the cutter on the work being chamfered being such as will urge the work being chamfered against the work support during the operation of the machine.

8. A machine for uniformly chamfering gear teeth comprising an arbor onto which a gear to be chamfered may be positioned in freely slidable and turnable relationship, a work support against which the work on the arbor rests, a pilot gear to which the work becomes meshed when placed on the arbor, a cutter including spaced cutting elements formed to chamfer the near sides and more than one-half of the root and top adjacent the said near sides of spaced teeth, means for intermittently applying the cutter to the work at cutting speed and at an angle forcing the work simultaneously toward the center of the arbor and in gaged relationship against the work support, the spacing of the cutting elements and the angle of attack thereof being such as will provide a substantially uniform chamfer throughout, and means for turning the pilot gear whereby to present adjacent spaced pairs of teeth on the work to the cutter in timed relationship to the approach of the cutter to the work, the work being freely manually placeable on and removable from the arbor while the machine is operating.

9. A machine for chamfering gears comprising a base, a drive shaft journaled in said base, means for driving the said drive shaft, an arbor onto which a gear to be chamfered is positioned in freely slidable and turnable relationship thereto, a work support at the base of the said arbor against which the gear to be chamfered is gaged when placed onto the arbor and is urged during chamfering, a pilot gear shaft and pilot gear thereon to which the gear to be chamfered is meshed when positioned onto the arbor, a gear train and intermittent drive mechanism operable responsive to the rotation of the drive shaft imparting intermittent rotation to the pilot gear and gear to be chamfered, a cutter rocker arm shaft turnably mounted in said base including a cutter eccentric thereon, a cutter rocker arm pivotally mounted on the said rocker arm shaft cutter eccentric including a cutter mounting block and cutter at the upper end thereof and a cutter cam follower at the lower end thereof, a cutter cam mounted on the said drive shaft, and spring means constantly urging the cutter cam follower against its cam, a relief arm adjustably fixed to the said rocker arm shaft including a relief cam follower on the lower end thereof, a relief cam mounted on the said drive shaft and spring means constantly urging the relief cam follower against its cam, the said relief arm imparting arcuate reciprocating movement to the rocker arm shaft and cutter eccentric thereon whereby to provide relief action to the cutter at the completion of its cutting stroke, the said cutter being composed of spaced cutting elements formed to make the desired chamfer cut on spaced teeth of the gear to be chamfered, the said cutter and relief cam being so formed as to cause the cutter to accomplish its cutting stroke and relief in timed relationship between the intermittent rotation of the gear to be chamfered.

10. A machine for chamfering gears as claimed in claim 9 wherein the intermittent drive mechanism comprises an interrupted worm mounted on the drive shaft engaging one of the gears of the gear train to impart intermittent rotation of the said pilot gear and gear to be chamfered.

11. A machine for chamfering gears as claimed in claim 9 wherein the intermittent drive mechanism imparts intermittent rotation to the pilot gear through the pilot gear shaft and pinion thereon.

12. A machine for chamfering gears as claimed in claim 11 wherein the pilot gear shaft and the arbor are shiftable laterally with respect to each other, and the pilot gear is replaceable by another pilot gear whereby to permit the chamfering of gears having different characteristics on the same machine.

13. A machine for chamfering gears as claimed in claim 9 wherein the intermittent drive mechanism comprises cam-worm construction composed of a cam-worm sleeve slidably splined onto the drive shaft onto which sleeve is formed a worm engaging one of the gears of the gear train and an axially disposed cam, a cam follower fixed longitudinally with respect to the drive shaft, and means constantly urging the axially disposed cam of the cam-worm sleeve against the cam follower, the surface of the said axially disposed cam being so formed as to prevent the worm of the cam-worm sleeve from imparting rotation to the gear of the gear train with which it is meshed during a portion of one revolution of the drive shaft and the desired rotation thereto during the remaining portion of the said revolution of the drive shaft.

14. A machine for chamfering gears as claimed in claim 9 wherein the intermittent drive mechanism imparts intermittent rotation to the pilot gear through the pilot gear shaft and a pinion thereon, wherein the pilot gear shaft and arbor are shiftable laterally with respect to each other, and the pilot gear is replaceable by another pilot gear whereby to permit the chamfering of gears having different characteristics on the same machine, and wherein the intermittent drive mechanism comprises cam-worm construction composed of a cam-worm sleeve slidably splined onto the drive shaft onto which sleeve is formed a worm engaging the pinion on the pilot gear shaft and an axially disposed cam, a cam follower fixed longitudinally with respect to the drive shaft, and means constantly urging the axially disposed cam of the cam-worm sleeve against the cam follower, the surface of the said axially disposed cam being so formed as to prevent the worm of the cam-worm sleeve from imparting rotation to the pinion on the pilot gear shaft with which it is meshed during a portion of one revolution of the drive shaft and the desired rotation thereto during the remaining portion of the said revolution of the drive shaft.

15. A machine for chamfering gears as claimed in claim 9 wherein an adjusting plate arcuately slotted at its lower end and fixed at its upper end in non-turnable relationship to the said rocker arm shaft adjustably fixes the relief arm to the rocker arm shaft, and a stud disposed through the arcuate slot in the said adjusting plate and threaded into the said rocker arm engaging the adjusting plate whereby to lock the adjusting plate to the relief arm and maintain the said rocker arm shaft in its arcuately adjusted position.

16. A machine for chamfering gears as claimed in claim 9 wherein a cycle indicator cam lever is pivotally mounted with respect to the base adjacent the arbor and the work support, the said indicator cam lever being formed with a cam surface engageable by a gear to be chamfered when positioned on the arbor and against the work support, switch means operable by the said cam lever when engaged by said gear to be chamfered, and means for indicating the completion of the chamfering of a gear connected to and actuated by the said switch means.

17. A machine for chamfering gears as claimed in claim 9 wherein the angle of attack of the cutter on the work being chamfered is such as will gage the work being chamfered against the work support during the operation of the machine.

18. A machine for chamfering gears as claimed in claim 9 wherein the lateral spacing and angle of attack of the cutting elements being such as will accomplish a substantially uniform chamfer cut throughout.

19. A machine for chamfering gears as claimed in claim 9 wherein the angle of attack of the cutter on the work being chamfered is such as will gage the work being chamfered against the work support during the operation of the machine, the lateral spacing and angle of attack of the cutting elements being such as will accomplish a substantially uniform chamfer cut throughout.

20. A machine for chamfering gears comprising a base, a drive shaft journaled in said base, means for driving the said drive shaft, an arbor onto which a gear to be chamfered is positioned in freely slidable and turnable relationship thereto, a work support at the base of the said arbor against which the gear to be chamfered is gaged when placed onto the arbor and is urged during chamfering, a pilot gear shaft and pilot gear thereon to which the gear to be chamfered is meshed when positioned onto the arbor, a gear train and intermittent drive mechanism operable responsive to the rotation of the drive shaft imparting intermittent rotation to the pilot gear and gear to be chamfered, a cutter rocker arm shaft mounted in said base, a cutter rocker arm pivotally mounted on the said rocker arm shaft including a cutter mounting block and cutter at the upper end thereof and a cutter cam follower at the lower end thereof, a cutter cam mounted on the said drive shaft, and spring means constantly urging the cutter cam follower against its cam, the said cutter being composed of spaced cutting elements formed to make the desired chamfer cut on spaced teeth of the gear to be chamfered, the said cutter cam being so formed as to cause the cutter to accomplish its cutting stroke in timed relationship between the intermittent rotation of the gear to be chamfered.

21. A machine for chamfering gears as claimed in claim 20 wherein the intermittent drive mechanism imparts intermittent rotation to the pilot gear through the pilot gear shaft and a pinion thereon.

22. A machine for chamfering gears comprising a base, a drive shaft journaled in said base, means for driving the said drive shaft, an arbor onto which a gear to be chamfered is positioned in freely slidable and turnable relationship thereto, a work support at the base of the said arbor against which the gear to be chamfered is gaged when placed onto the arbor and is urged during chamfering, a pilot gear shaft and pilot gear thereon to which the gear to be chamfered is meshed when positioned onto the arbor, a pinion gear on the pilot gear shaft, a worm on the said drive shaft engaging the said pinion gear turning the gear to be chamfered one tooth for each revolution of the drive shaft, a cutter on the said drive shaft including spaced cutting elements formed to make the desired chamfer cut on successive pairs of spaced teeth of the gear to be chamfered with each revolution of the drive shaft until all of the teeth of the gear to be chamfered have been chamfered, the spacing of the cutting elements and the angle of attack on the gear being chamfered being such as will urge the gear being chamfered in gaged relationship against the said work support and provide a substantially uniform chamfer throughout.

23. The method of chamfering end edges of the teeth of circular toothed elements, each of said elements having identical teeth equidistantly spaced around the periphery of the element, said method comprising application of two cutting elements to at least two meeting edges of each of two spaced teeth, with said cutting elements moved in cutting along parallel substantially straight lines and said two teeth being separated by at least one intervening tooth and so selected as to their spacing that both of said lines lie in planes which substantially bisect the angles made by said meeting edges of the respective teeth.

24. The method of chamfering end edges of gear teeth, said method comprising application of two cutting elements to at least two meeting edges of each of two spaced teeth, with said cutting elements moved in cutting along substantially straight lines parallel to each other, said two spaced teeth being separated by at least one intervening tooth and so selected as to their spacing that both of said lines lie in planes which substantially bisect the angles formed by said meeting edges of the respective teeth.

25. The method of chamfering end edges of the sides of gear teeth, said method comprising application of two cutting elements to at least one side edge of each of two spaced teeth, said teeth being separated by at least one intervening tooth with said cutting elements moved in the process of cutting along substantially straight line paths parallel to each other.

26. The method of chamfering end edges of gear teeth, said method comprising application of two cutting elements to at least side and root edges of each two spaced teeth, with said cutting elements moved along lines parallel to each other, said two spaced teeth being separated by at least one full intervening tooth and so selected as to their spacing that both of said lines lie in planes which substantially bisect the angles formed by the side and root edges of the respective teeth.

27. The method of chamfering end edges of gear teeth, said method comprising application of two cutting elements to at least side and root edges of each of two spaced teeth, with said cutting elements moved along lines parallel to each other, said two spaced teeth being separated by at least one intervening tooth and so selected as to their spacing that both of said lines lie in planes which bisect as nearly as possible the angles formed by the side and root edges of said respective two teeth and without interference of their respectively adjacent teeth with chamfering by said cutting elements of more than one-half of each respective root edge.

28. The method of chamfering end edges of gear teeth, said method comprising application of two cutting elements to at least side and root edges of each of two spaced teeth, with said cutting elements moved along lines parallel to each other, said two spaced teeth being separated by at least one intervening tooth and so selected as to their spacing that both of said lines are parallel to the lines representing intersections of the planes of chamfer at said side and root edges, and said last lines being also substantially parallel to each other.

29. In a machine for chamfering end edges of the teeth of toothed elements, said method comprising simultaneous application of a cutter to at least two meeting edges of the same tooth of each of two spaced teeth of an element, with said edges forming an angle therebetween, cutter means having sets of two cutting lips having outlines determined in part by the outlines of at least two meeting edges of two spaced teeth, said teeth being separated by at least one intervening tooth and so selected that when said lips are moved along parallel lines, both of said lines lying in the planes which substantially bisect respectively both of the angles formed by the meeting edges of said two teeth, means to actuate said cutter means to cause said cutting lips to move along such parallel paths, and means to rotate said element intermittently to present new teeth to the action of said cutting means to chamfer successively all of the teeth of the work element from both sides of the teeth.

30. In a machine for chamfering end edges of gear teeth, said machine comprising fixture means adapted to receive the work gear and to restrain it from radial movement, stop means in said fixture means adapted to bear on the gear face to be chamfered and thus to restrain the work gear from axial movements in one direction only, cutter means having two cutting lips having outlines determined in part by the outlines of at least two meeting edges of two spaced teeth of the work gear, said teeth being separated by at least one intervening tooth and so selected as to their spacing that when said lips are moved along parallel lines, both of said lines lying in the planes which substantially bisect, respectively, both of the angles formed by the meeting edges of said two teeth, means to reciprocate said cutter, and means to cause said cutting lips to move along such parallel lines and to produce cutting strokes thereof urging said work gear against the stop means restraining it from axial movements.

31. The method of chamfering end edges of a tooth of a circular toothed element, said method comprising substantially simultaneous application of a cutter to at least two tooth edges actually meeting at a vertex to form an angle therebetween, with said cutter having configuration of its cutting edges corresponding to that of the tooth edges to be chamfered with said cutting edges also meeting to form an apex, and moving said cutter to have the apex thereof move in the process of cutting along a substantially straight line passing through the vertex of the angle formed by said tooth edges and with said line being separated by at least one full intervening tooth from a plane parallel to said line with said plane passing through the axis of the toothed element.

32. A method of chamfering end edges of a tooth of a gear, said method comprising substantially simultaneous application of a cutter to at least a side tooth edge and a root tooth edge actually meeting at a vertex to form an angle therebetween, with said cutter having configuration of its cutting edges corresponding to that of the tooth edges to be chamfered, with said cutting edges meeting to form an apex, and moving said cutter to have the apex thereof move in the process of cutting along a substantially straight line lying in the plane substantially bisecting the mean angle formed by said tooth edges, with said line being disposed at a distance equal to more than one half of the circular pitch of the gear from a plane parallel to said line, with said plane passing through the axis of the gear.

33. The method of chamfering end edges of a tooth of a gear, said method comprising substantially simultaneous application of a cutter to at least two tooth edges actually meeting at a vertex to form an angle therebetween, with said cutter having two cutting edges of a configuration corresponding to that of the edges to be chamfered and said cutting edges also meeting to form an apex, and moving said cutter to have the apex thereof move in the process of cutting both of said edges along a substantially straight line substantially coinciding with the intersection of the planes of the chamfers of said two meeting tooth edges, with said intersection being on a plane parallel to a plane passing through the axis of the gear and said last two planes being separated by a distance equal to more than one half of the circular pitch of the gear.

34. In a machine for chamfering end edges of gear teeth, a cutter adapted to chamfer at least side end edges of a predetermined work gear, fixture means adapted to receive and to locate the work gear in a position for chamfering but providing for rotation of the work gear with respect thereto, a radial arm having a hinged portion and a free end, said free end being adapted to carry said cutter, and indexing means drivingly connected to said work gear but free of driving connection to said fixture means, said indexing means engaging the work gear for alternately indexing the same through a predetermined angle, for locating said work gear in position at the end of the indexing movement, and for restraining it from rotation while cutting takes place, said indexing means being positively connected to said cutter in order to index the gear in relation to the movements of said cutter.

35. In a machine for chamfering end edges of the teeth of gears, said machine comprising fixture means adapted to receive the gear and to locate it both radially and axially, a cutter having a cutting lip adapted in its outline to the outline of at least two meeting edges of one tooth, and means to reciprocate said cutter to produce cutting strokes along a line lying in a plane that substantially bisects the angle formed by said meeting tooth edges, with said plane spaced from a radial line parallel to it by a distance equal to at least one circular pitch of the gear, and means to rotate said gear intermittently to present new teeth to the action of said cutter to chamfer successively all of the teeth of the gear.

36. The method of chamfering end edges of the teeth of circular toothed elements having teeth spaced along the circumference of the element, said method including the steps of supporting said toothed element at a stop at the face to be chamfered, and applying a chamfering cutter to the toothed element to chamfer the end edges of two spaced teeth thereof, with said cutter being applied in the process of cutting at such an angle with respect to the toothed element that the face thereof to be chamfered is urged against said stop.

37. The method of chamfering end edges of the teeth of circular toothed elements having teeth spaced along the circumference of the element, said method including the steps of supporting such toothed element at a stop at the face to be chamfered but free to be moved away from said stop, and applying a chamfering cutter to the toothed element to chamfer the end edges of the teeth thereof, with said cutter being applied in the process of cutting at such an angle with respect to the toothed element that the face thereof to be chamfered is urged against said stop.

38. The method of chamfering teeth of circular toothed elements having identical teeth equidistantly spaced along the circumference of the element, said method comprising supporting such toothed element at a stop at the face to be chamfered in turnable relationship and free to move axially away from said stop, turning and stopping the toothed element intermittently, applying a continuously reciprocating chamfering cutter intermittently to the toothed element in timed relationship during the stops of said elements to chamfer the teeth thereof, said cutter being applied in the process of cutting at such an angle with respect to the toothed element that the face thereof to be chamfered is urged against said stop.

39. The method of chamfering the ends of the teeth of a circular toothed element having identical teeth equidistantly spaced along the circumference of the element, said method comprising the applying of a chamfering tool having two cutting teeth substantially simultaneously to the ends of near sides of two spaced non-adjacent teeth of the element and more than one-half of the length of the root edges adjacent the said ends of the near side of said spaced teeth, with said spaced teeth being separated by at least one intervening tooth, and the two cutting teeth of the chamfering tool moving along chordal lines parallel to each other, turning the toothed element to present other sets of spaced teeth to said chamfering tool and again applying the said tool, and repeating the turning of the toothed element and applying of the chamfering tool until all of the ends of the teeth are completely chamfered on both sides and roots therebetween.

40. A machine for chamfering end edges of the teeth of a gear, said machine comprising a supporting structure, a drive shaft journaled in said structure, driving means for said drive shaft, an arbor onto which the gear to be chamfered is positioned in turnable relationship, a work support against which the gear to be chamfered is gauged when placed unto the arbor, a work turning gear to which the gear to be chamfered is meshed when positioned on the arbor, an intermittent drive mechanism operable responsive to the rotation of the drive shaft to impart intermitting rotation to the work turning gear and the gear to be chamfered, a pivotally mounted cutter rocker arm, a cutter carried by said rocker arm at one end thereof and a cutter cam follower carried at the other end thereof, a cutter cam mounted on the said drive shaft, and resilient means constantly urging said follower against said cam, said cutter cam being so formed as to cause the cutter to accomplish its cutting stroke between the intermittent rotation of the gear to be chamfered, said cutter urging the gear to be chamfered against said work support while cutting.

JOHN M. CHRISTMAN.

References Cited in the file of this patent

UNITED STATES PATENTS

| Number | Name | Date |
|---|---|---|
| 1,110,274 | Sponable | Sept. 8, 1914 |
| 1,578,589 | Earl | Mar. 30, 1926 |
| 1,928,770 | Uhlmann et al. | Oct. 3, 1933 |
| 1,975,151 | Hill | Oct. 2, 1934 |
| 2,078,124 | Condon | Apr. 20, 1937 |
| 2,433,201 | Cross | Dec. 23, 1947 |
| 2,443,089 | Wildhaber | June 8, 1948 |